(12) United States Patent
Houck et al.

(10) Patent No.: US 6,383,372 B1
(45) Date of Patent: May 7, 2002

(54) SEQUENTIAL FLOW FILTRATION CHAMBER FOR TREATMENT OF WASTE WATER AND ASSOCIATED METHOD

(76) Inventors: Michael H. Houck, P.O. Box 956; Thomas K. Weaver, 123 Buena Vista, both of Brevard, NC (US) 28712

( * ) Notice: Subject to any disclaimer, the term of this patent is extended or adjusted under 35 U.S.C. 154(b) by 0 days.

(21) Appl. No.: 09/479,791

(22) Filed: Jan. 8, 2000

(51) Int. Cl.⁷ .................. B01D 24/00; B01D 27/02; C03F 3/06
(52) U.S. Cl. .................. 210/150; 210/170; 210/282; 210/336; 210/484; 405/43
(58) Field of Search ............... 210/615–617, 210/747, 150–151, 170, 336, 264, 282, 484, 532.2, 532.1; 405/36, 43

(56) References Cited

U.S. PATENT DOCUMENTS

| | | | |
|---|---|---|---|
| 607,426 A | * | 7/1898 | Ducat |
| 936,464 A | * | 10/1909 | Lucas |
| 1,450,770 A | * | 4/1923 | Frick et al. |
| 1,738,521 A | * | 12/1929 | Bomhoff |
| 1,991,896 A | * | 2/1935 | Hays |
| 4,370,234 A | * | 1/1983 | Marsland |
| 5,674,399 A | * | 10/1997 | Davis |
| 5,707,513 A | * | 1/1998 | Jowett et al. |
| 5,738,781 A | * | 4/1998 | Carlson |
| 5,958,239 A | * | 9/1999 | Sing |
| 5,980,739 A | * | 11/1999 | Jowett et al. |
| 5,980,761 A | * | 11/1999 | Boissie et al. |
| 5,997,747 A | * | 12/1999 | Jowett |
| 6,190,548 B1 | * | 2/2001 | Frick |
| 6,210,567 B1 | * | 4/2001 | Takada |
| 6,277,280 B1 | * | 8/2001 | Houck |

FOREIGN PATENT DOCUMENTS

JP 58-128195 * 7/1983

* cited by examiner

Primary Examiner—David A. Simmons
Assistant Examiner—Fred Prince
(74) Attorney, Agent, or Firm—Allen, Dyer, Doppelt, Milbrath & Gilchrist, P.A.

(57) ABSTRACT

A sequential flow filtration chamber for treatment of waste water effluent from a septic tank comprises an inlet positioned in fluid communication with the septic tank for receiving waste water into the chamber, at least one partition positioned within the chamber so as to define a substantially sequential flow path for the waste water, a filter positioned within the flow path for filtering the waste water flowing therethrough, and an outlet positioned in fluid communication with the flow path for discharging filtered waste water from the chamber. The chamber may include a sequential flow path disposed substantially vertically or substantially horizontally. A sequential flow nitrification drain field for filtration treatment of waste water comprises a source of waste water, and at least one sequential flow filtration chamber. The source of waste water for the drain field is preferably a septic tank. The drain field may comprise a plurality of chambers connected in fluid communication. A method of treating waste water effluent from a septic tank includes the step of sequentially filtering the waste water effluent by channeling the waste water through a flow path containing a plurality of filtering particles so as to sufficiently treat the waste water for discharge. The step of filtering may be performed a plurality of times before the waste water is discharged.

11 Claims, 8 Drawing Sheets

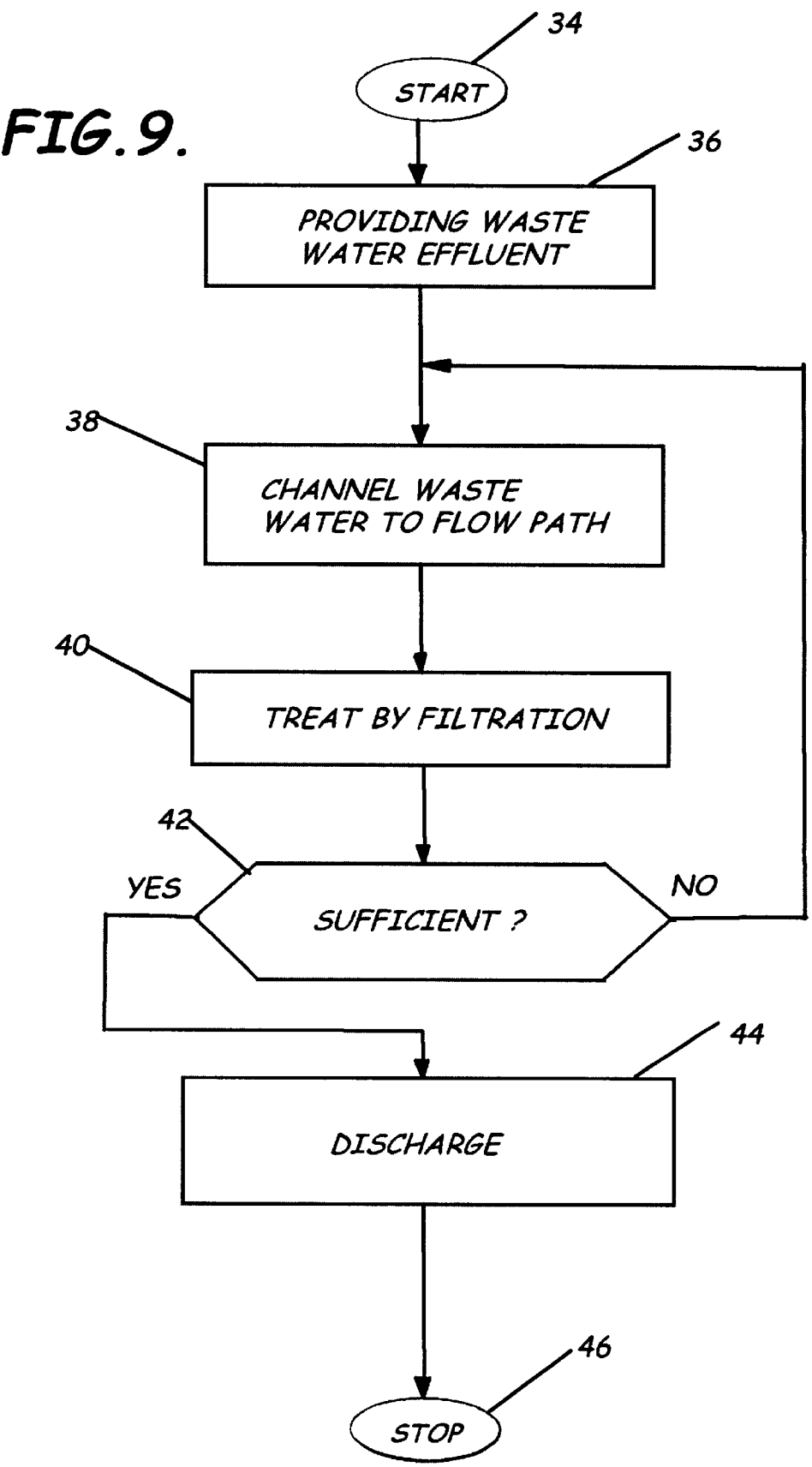

SEQUENTIAL FLOW FILTRATION CHAMBER FOR TREATMENT OF WASTE WATER AND ASSOCIATED METHOD

FIELD OF THE INVENTION

The present invention relates to the field of waste water treatment and, more particularly, to treatment of waste water effluent from a septic tank prior to disposal.

BACKGROUND OF THE INVENTION

Drainage fields for land application of septic tank waste water effluent have traditionally been constructed by digging trenches on land adjoining the septic tank. Filtering beds are created in these trenches by depositing a layer of filtering material in the bottom of the trenches. Conventional filtering material is rock, crushed stone gravel, sand, or a combination thereof. A network of perforated pipes is then connected to the septic tank and laid in the trenches on top of the filter bed. The waste water effluent from the septic tank is distributed through the network of perforated pipes and trickles onto and through the filter bed, where its nutrient content is reduced by microbial action. After passing through the filtering material, the waste water effluent percolates through and is absorbed by the soil surrounding and underlying the drain field trench. Such systems normally operate by gravity flow, however, it is common practice to connect a pump to the septic tank to aid in moving the waste water effluent from the septic tank and through the drainage field, particularly where required by the lay of the land.

Standard practices, however, suffer from severe disadvantages. For example, conventional drainage fields for septic tanks require the transportation of heavy materials, such as the stone, rock gravel or sand required for installing filtration beds. In addition, conventional drainage fields generally operate for years, however, when they become clogged or otherwise stop functioning as designed, they must be dug up and replaced. Replacement of the drainage field costs essentially as much as installing a completely new field, and perhaps more.

SUMMARY OF THE INVENTION

With the foregoing in mind, the present invention provides a sequential flow nitrification drain field for filtration treatment of waste water. The invention is suited for treatment of waste water, and especially waste water effluent from a septic tank. The invention provides a renewable drain field which may be left in place for an extended useful life, and which provides enhanced treatment of the waste water.

The invention discloses a sequential flow filtration chamber for treatment of waste water effluent from a septic tank. In contrast to a conventional filtration chamber, the sequential flow filtration chamber includes one or more partitions arranged so as to channel the waste water in a flow path through the chamber. Thus, the term "sequential flow" refers to the progression of the waste water through the flow path wherein the waste water receives filtration treatment which is incremental in nature. The treatment is incremental, since the waste water generally traverses the complete flow path before being discharged from the chamber.

The chamber comprises an inlet positioned in fluid communication with the septic tank for receiving waste water into the chamber. A plurality of partitions is positioned within the chamber so as to define a substantially sequential flow path for the waste water to follow. A filter is positioned within the flow path for filtering the waste water flowing in the flow path. An outlet is positioned in fluid communication with the flow path for discharging filtered waste water from the chamber. The partitions may be arranged within the chamber so that the sequential flow path is substantially vertical, or substantially horizontal.

The chamber may further comprise a removable cover to thereby provide access to the interior of the chamber. The filter is preferably a removable filter to thereby allow for periodic replacement. The filter comprises a lightweight particulate material enclosed within a water permeable sleeve, which may be in the form of a mesh. The lightweight filtering material may comprise a material selected from expanded polystyrene, and rubber chips such as from ground up tires. The filter is substantially arranged to comprise particulate material graded in size along the flow path so as to have relatively larger particles positioned toward the inlet and relatively smaller particles positioned toward the outlet.

The invention further provides a sequential flow nitrification drain field for filtration treatment of waste water. The drain field comprises a source of waste water, and at least one sequential flow filtration chamber. Preferably, the source of waste water for such a drain field is a septic tank.

The drain field of the present invention may further comprise a plurality of sequential flow filtration chambers connected in fluid communication to the source of waste water. The drain field may also include a plurality of sequential flow filtration chambers connected to each other in serial fluid communication so as to form a chain of chambers to thereby provide substantially incremental filtration of the waste water before discharge from the drain field.

The drain field is preferably disposed with at least one sequential flow filtration chamber having a replaceable filter. Having such replaceable filters, the drain field may be easily renewed, and thereby provides a lifetime which greatly exceeds that of a conventional septic tank drain field.

The drain field may also include other components, such as a distribution box connected in fluid communication generally between the waste water source and the sequential flow filtration chamber. In addition, the drain field may further comprise a discharge box having an inlet connected in fluid communication with the outlet of the chamber for receiving filtered waste water, and an outlet for discharging filtered waste water from the drain field for final disposal. The discharge box may comprise a plurality of outlets for discharging filtered waste water. The filtered waste water may be directed to flow through the plurality of outlets of the discharge box into a final filter prior to being discharged. Final disposal of the treated wastewater may be by discharge for soil percolation, or by any other approved method.

The present invention also provides for a method of treating waste water effluent from a septic tank. The method comprises the step of filtering the waste water effluent from the septic tank by channeling the waste water through a flow path containing a plurality of filtering particles so as to sufficiently treat the waste water for discharge. The step of filtering may be performed a plurality of times before the waste water is discharged. In addition, the filtering step may include filtering particles graded in size so as to comprise relatively larger particles positioned toward a start of the flow path and relatively smaller particles positioned toward an end of the flow path. The method may include a flow path which is substantially vertical, or substantially horizontal, and which extends through a plurality of connected chambers.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 9 is a flow diagram of the method of the invention.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime notation when used indicates similar elements in alternative embodiments.

FIGS. 1 through 9 show the various aspects of the present invention, which discloses a sequential flow filtration chamber 10 for treatment of waste water effluent from a septic tank 12, a drainage field employing sequential flow filtration chambers, and an associated method of treating waste water effluent from a septic tank.

Figure 4:
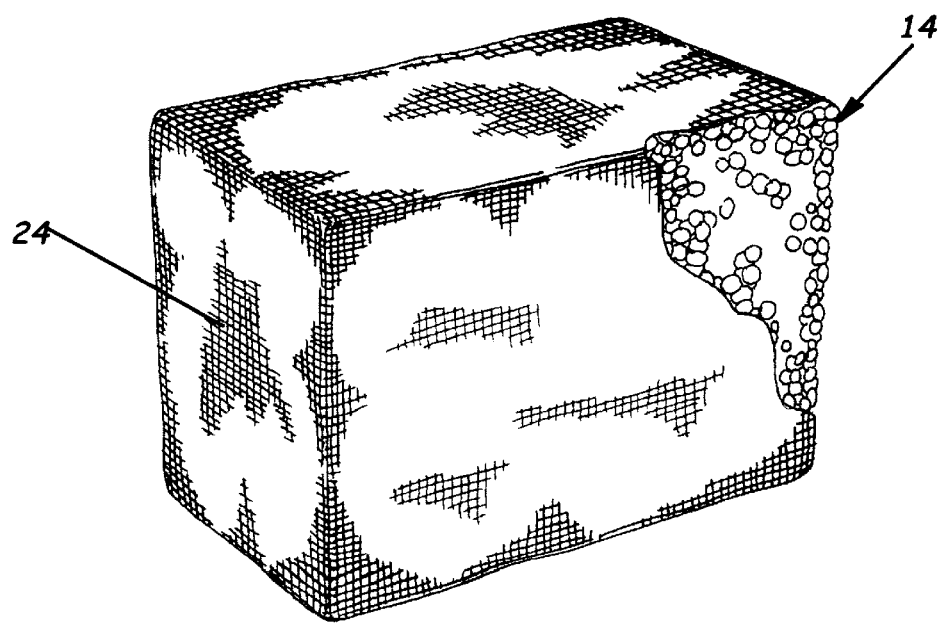
FIG. 4 illustrates a replaceable filter block.
Figure 5:
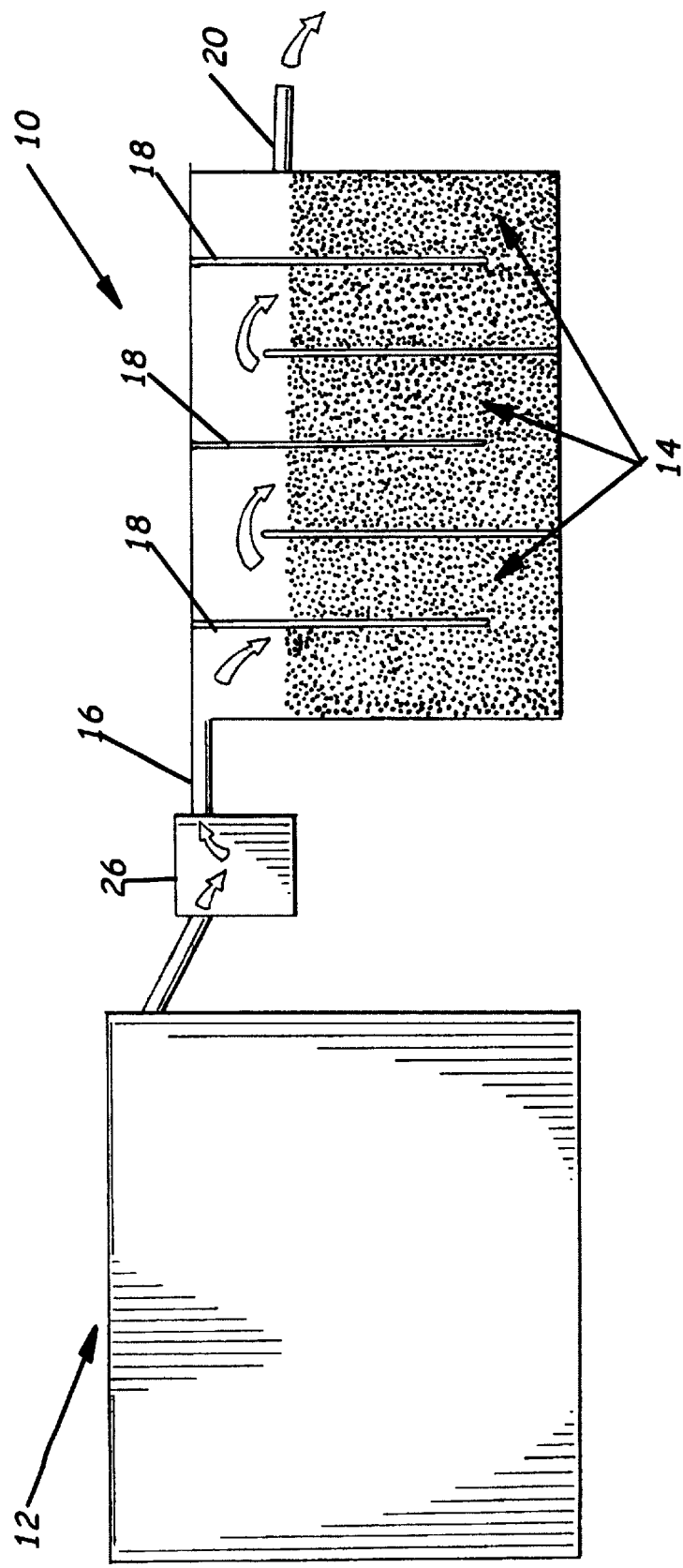
FIG. 5 is a schematic side view of a vertical flow chamber connected to a septic tank and distribution box.
Figure 6:
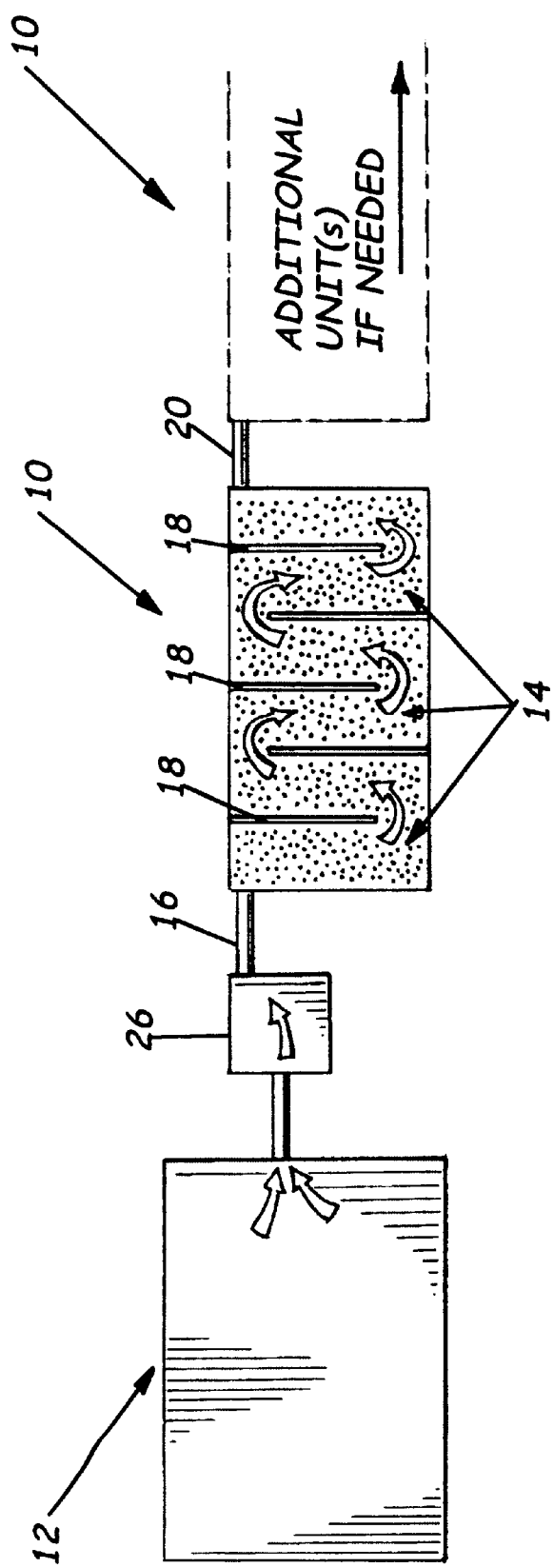
FIG. 6 is a schematic top view of a horizontal flow chamber connected to a septic tank and distribution box.

The invention is particularly advantageous in that, in contrast to other systems of waste water effluent filtration, the sequential flow filtration chamber 10 includes one or more partitions arranged to provide for channeling the waste water in the interior of the chamber through a flow path comprising a filter 14, as best shown in FIGS. 1 through 7. Thus, the term "sequential flow" refers to the progression of the waste water through the flow path wherein the waste water receives filtration treatment which is incremental in nature. The treatment is incremental because the waste water traverses substantially the entire flow path, and the filter therein, before being discharged from the chamber 10. A chamber 10, or a plurality of connected chambers, may be deployed to substitute for an entire conventional septic tank drain field, as shown in FIG. 6.

Figure 1:
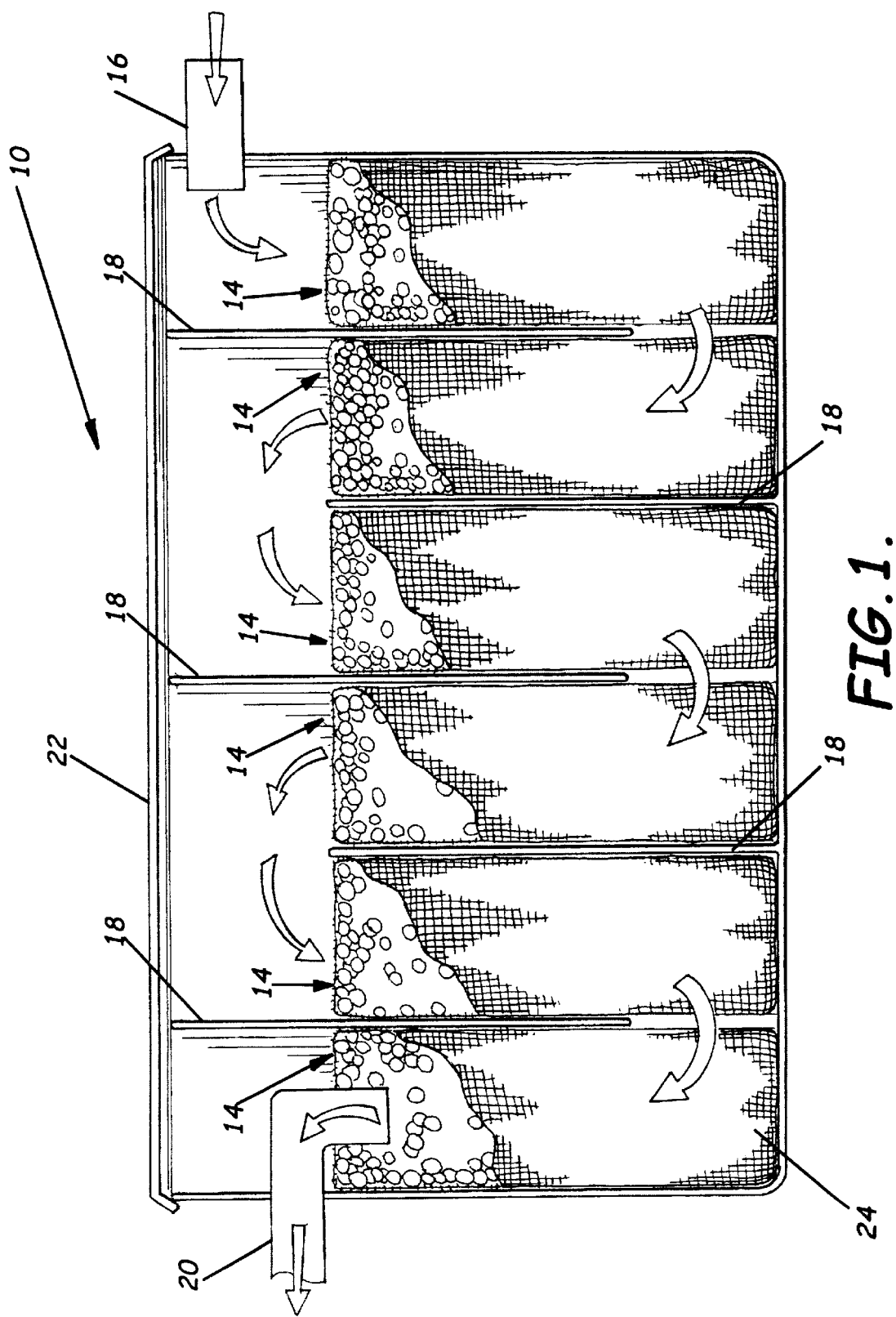
FIG. 1 is a side schematic view of a vertical sequential flow filtration chamber according to an embodiment of the present invention.
Figure 2:
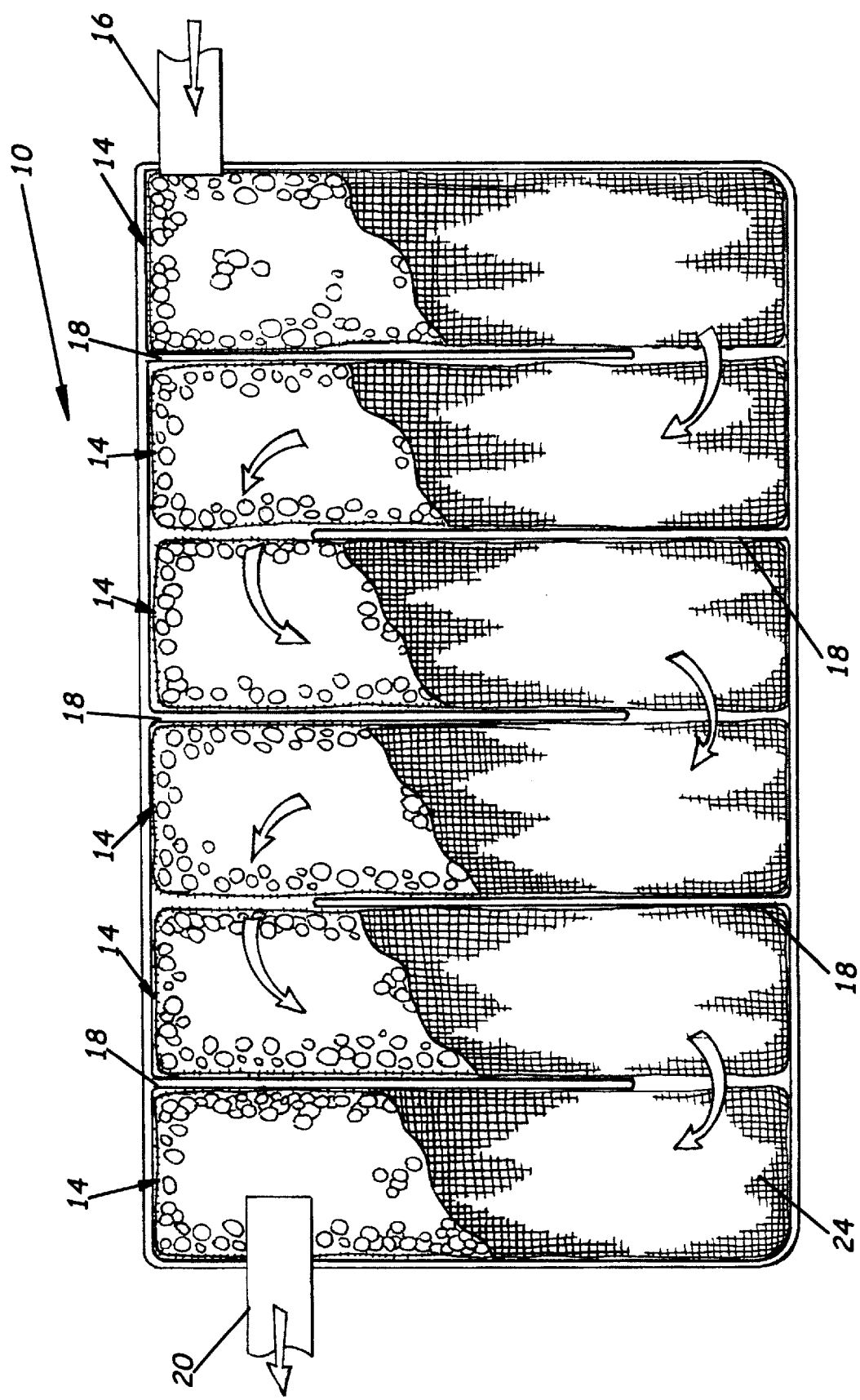
FIG. 2 is a top schematic view of a horizontal sequential flow filtration chamber.
Figure 3:
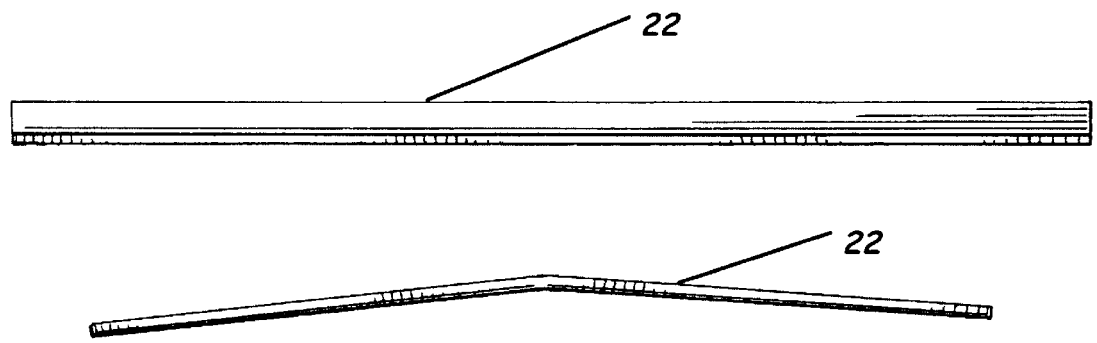
FIG. 3 shows a chamber cover in side and front elevation.

The novel sequential flow filtration chamber 10 of the present invention comprises an inlet positioned substantially at the start of the flow path in fluid communication with the septic tank 12 for receiving waste water effluent into the chamber. As best shown in FIGS. 1 and 2, at least one partition 18, and preferably a plurality of partitions, is positioned within the chamber to define a substantially sequential flow path for the waste water to follow. Those skilled in the art will recognize that the number of partitions may be varied according to the desired treatment characteristics required for particular applications of the invention. A filter 14 is positioned within the flow path for filtering the waste water as it flows through the flow path. Substantially at the end of the flow path, the chamber 10 has an outlet 20 positioned in fluid communication with the chamber for discharging filtered waste water flowing from the flow path. The skilled artisan will also understand that the positioning of the inlet and outlet on the chamber may vary according to the requirements of the specific application, or the topography of the site, and for example depending on whether the chamber is above or below ground.

As shown in FIGS. 1 and 2, and 5 and 6, the chamber partitions 18 may preferably be arranged so that the sequential flow path is substantially vertical, or substantially horizontal. Filtering material is positioned within the chamber, preferably to a depth of from about 1 foot to about 3 feet. In contrast with other waste water treatment systems, in the present invention substantially no waste water is released from the chamber 10 until after flowing through the complete sequential flow path for filtration treatment. The waste water, thereby, receives incremental filtration as it proceeds through the flow path. A vertical flow path, as shown in FIGS. 1, 5, and 7, is particularly advantageous in that such chambers 10 may be made deeper, allowing for installation of the drain field in a substantially smaller area of land, yet providing equal or more extensive filtration treatment than conventional drain fields requiring much more land surface.

In a preferred embodiment of the invention, shown schematically in FIG. 1, the chamber 10 further comprises a removable cover 22 to thereby provide access to the interior of the chamber. Also as shown, the filter 14 preferably comprises a removable filter, thereby allowing for periodic replacement. For example, after being in operation for a length of time, the chamber 10 may be opened, the old filter 14 removed and replaced with a new filter, thereby providing the chamber and drain field with a substantially unlimited useful life.

In another preferred embodiment of the invention, the filter 14 comprises a lightweight particulate material enclosed within a water permeable sleeve, which may preferably be fabricated out of a mesh material, as illustrated in FIGS. 1, 2 and 4. The lightweight filtering material enclosed within the mesh may be selected from a material such as expanded polystyrene, and rubber chips such as from ground up tires. The filter 14 is most advantageously arranged to comprise particulate material graded in size along the flow path within the chamber so as to have relatively larger particles positioned toward the inlet and relatively smaller particles positioned toward the outlet, thereby providing a filter having progressively increasing surface area for enhanced waste water treatment.

Figure 7:
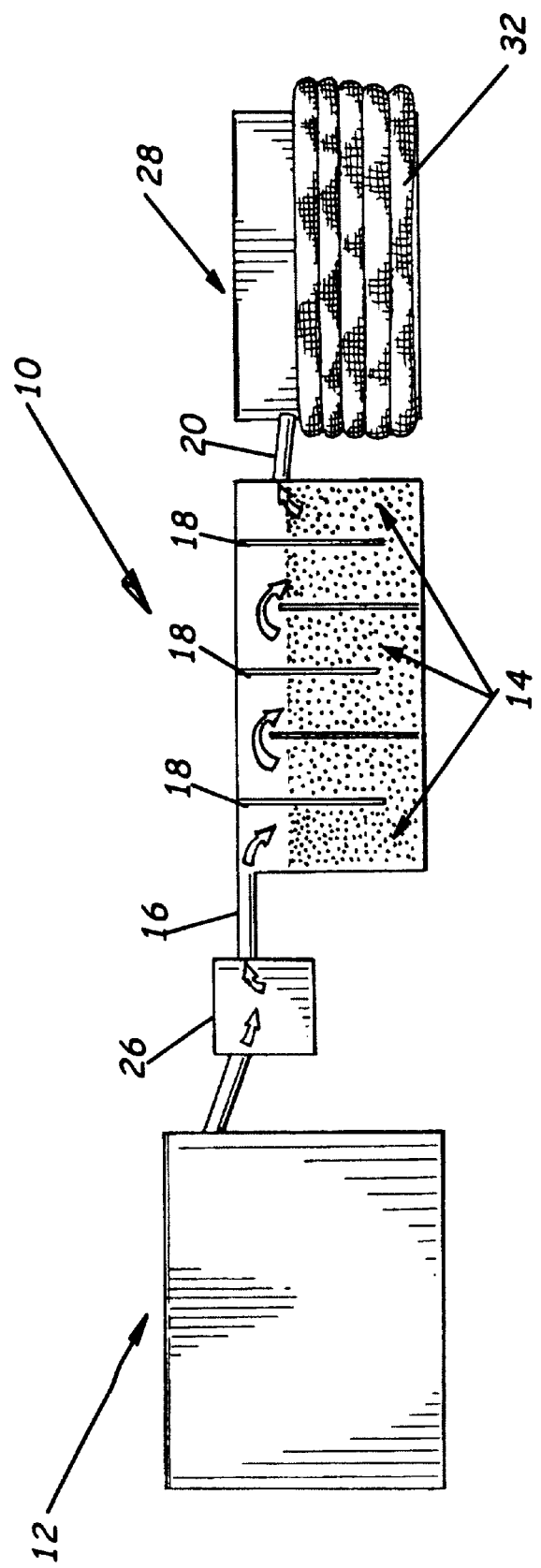
FIG. 7 is a side view showing a discharge box connected to the a chamber and septic tank.

As shown in FIGS. 5-7, the invention further advantageously provides a sequential flow nitrification drain field for filtration treatment of waste water. The drain field comprises a source of waste water, and a sequential flow filtration chamber 10. A preferred source of waste water for the drain field is a septic tank 12, as shown in FIGS. 5-7.

In yet another preferred embodiment of the invention, the drain field may further comprise a plurality of sequential flow filtration chambers 10 connected in fluid communication to the source of waste water 12. As shown in FIG. 6, the chambers 10 are preferably connected to each other in serial fluid communication so as to form a chain of chambers which together form an extended flow path providing incremental filtration of the waste water before discharge from the drain field. In a drain field having several chambers 10 serially connected one to the other, the particulate filtration material may be graded in size so that the first chamber in the series is disposed with relatively larger particles, and so on down the line, so that the last chamber is disposed with relatively smaller particles. Such progressively smaller filtering particles from chamber to chamber provide increasing surface area within the filter material for incremental filtration treatment of the waste water. Preferably, substantially no waste water is discharged from the drain field until after flowing through the extended flow path. However, those skilled in the art will understand that the filtration and discharge characteristics of the drain field may be modified to suit the particular application, the land area available, and the applicable regulations.

The drain field of the present invention is disposed with at least one sequential flow filtration chamber 10, each chamber having a replaceable filter 14. The replaceable filter comprises lightweight particulate filtering particles enclosed within a water permeable sleeve, preferably a mesh bag which may be lifted out of the chamber for easy replacement. As noted above, having such replaceable filters 14, the treatment capacity of the drain field may be easily renewed as needed to thereby provide a useful lifetime, greatly exceeding that of a conventional septic tank drain field.

Figure 8:
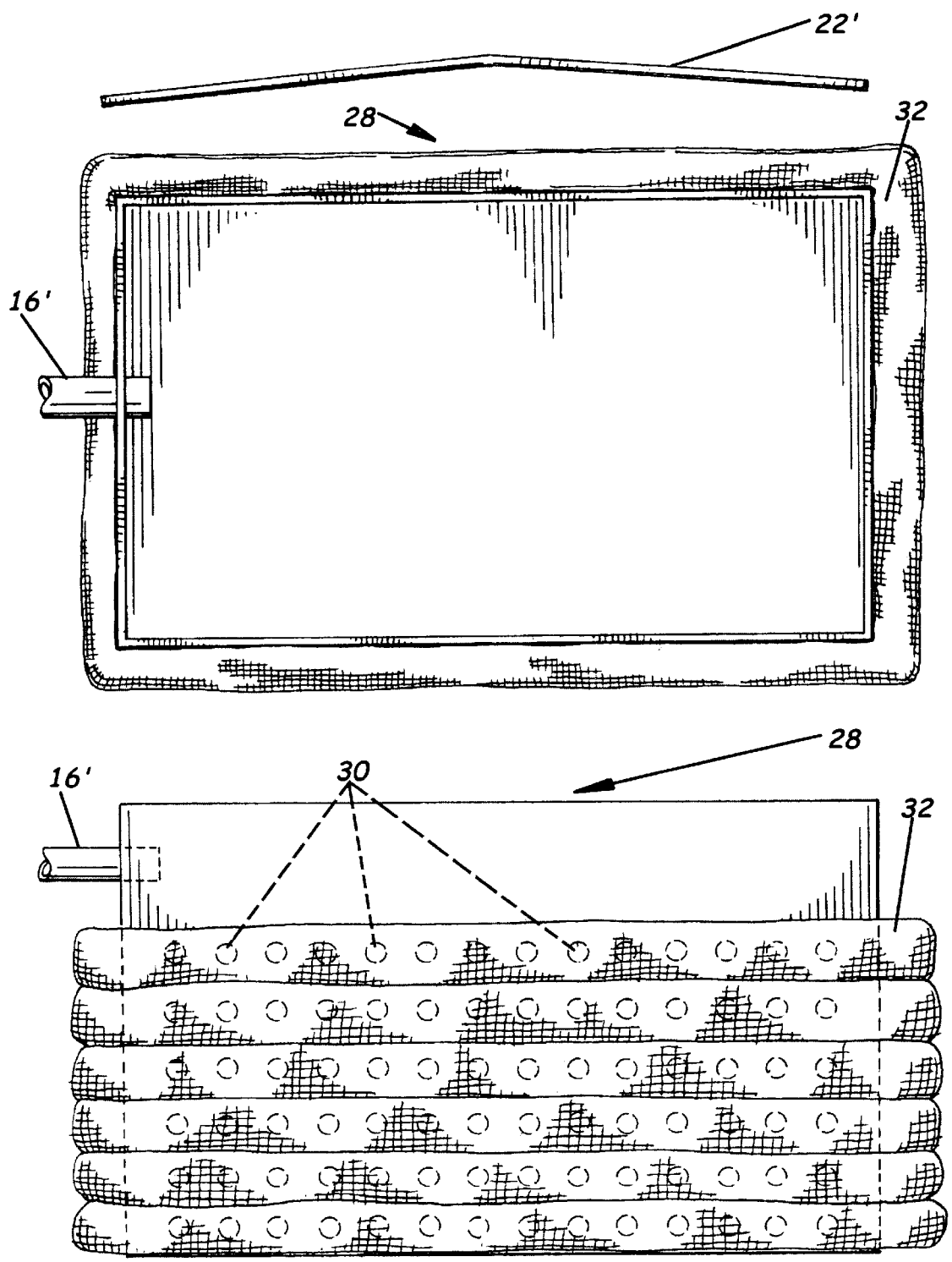
FIG. 8 includes side and top views of a discharge box and a front elevation of the discharge box cover.

The drain field of the present invention preferably may also include other components, as shown in FIGS. 5 through 7. For example, a distribution box 26 may be connected in fluid communication between the waste water source 12 and the sequential flow filtration chamber 10 for providing a buffer for peak flows within the system. In addition, in another preferred embodiment the drain field may further comprise a discharge box 28 having an inlet 16' connected in fluid communication with the outlet 20 of the chamber 10 for receiving filtered waste water, and at least one outlet 30 for discharging filtered waste water from the drain field for final disposal. As shown in FIG. 8, the discharge box 28 preferably comprises a plurality of outlets 30 for discharging filtered waste water. Advantageously, the filtered waste water may be directed to flow through the plurality of outlets 30 of the discharge box 28 into a final filter 32 prior to being discharged. Those skilled in the art will appreciate that the final filter 32 may be positioned either on the inside of the discharge box 28 or on the outside of the discharge box outlets 30. However, as seen in FIG. 8, the final filter 32 is preferably disposed to surround the discharge box 28, to thereby not only provide final filtration, but also to reduce the impact of the outflow, helping prevent the washing away of soil surrounding the discharge box. Final disposal of the treated wastewater is preferably by percolation from the discharge box 28 into the surrounding soil, but other disposal methods may also be employed.

The present invention also advantageously provides a method of treating waste water effluent from a septic tank. The method is illustrated schematically in the flow diagram shown in FIG. 9. The method starts at Block 34 by the step of providing waste water effluent (Block 36) from the septic tank. The waste water is channeled (Block 38) through a flow path containing a plurality of filtering particles so as to sufficiently treat the waste water (Block 40) for discharge. When sufficiently treated (Block 42) the waste water is discharged (Block 44), and the method stops (Block 46).

In another preferred embodiment of the method, the step of filtering is performed a plurality of times (Block 42) before the waste water is discharged for disposal. In addition, the filtering step may advantageously include filtering particles graded in size so as to comprise relatively larger particles positioned toward a start of the flow path and relatively smaller particles positioned toward an end of the flow path. The method may also include a flow path which is substantially vertical, or substantially horizontal.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A sequential flow nitrification drain field for filtration treatment of waste water, said drain field comprising:
   a source of waste water; and
   at least one sequential flow filtration chamber comprising an inlet positioned in fluid communication with said source for receiving waste water into the chamber, at least one partition positioned within said chamber to define a substantially unidirectional sequential flow path to therethrough channel the waste water, a replaceable filter comprising a plurality of particles enclosed within a water permeable sleeve positioned in the flow path for filtering the waste water, and an outlet positioned in fluid communication with the chamber for discharging filtered waste water therefrom.

2. The drain field of claim 1, wherein said source of waste water is a septic tank.

3. The drain field of claim 1, further comprising a plurality of sequential flow filtration chambers connected in fluid communication to said source of waste water.

4. The drain field of claim 1, wherein the replaceable filter further comprises filtering particles graded in size so as to comprise relatively larger particles positioned toward a start of the flow path and relatively smaller particles positioned toward an end of the flow path.

5. The drain field of claim 1, further comprising a plurality of sequential flow filtration chambers connected to each other in serial fluid communication so as to form a chain of chambers to thereby provide a substantially continuous flow path for incremental filtration of the waste water before discharge from the drain field.

6. The drain field of claim 5, further comprising filtering particles graded in size so as to comprise relatively larger particles positioned toward a start of the substantially continuous flow path and relatively smaller particles positioned toward an end of the substantially continuous flow path.

7. The drain field of claim 1, wherein the replaceable filter further comprises particulate material enclosed within a water permeable sleeve.

8. The drain field of claim 1, further comprising a distribution box connected in fluid communication between said source and said chamber.

9. The drain field of claim 1, further comprising a discharge box having an inlet connected in fluid communication with the outlet of said chamber for receiving filtered waste water, and an outlet for discharging filtered waste water from the drain field.

10. The drain field of claim 1, further comprising a discharge box having a plurality of outlets for discharging filtered waste water from the drain field.

11. The drain field of claim 10, wherein the filtered waste water flows through said plurality of outlets into a final filter prior to being discharged.

* * * * *